United States Patent
Cao et al.

(10) Patent No.: US 9,298,849 B2
(45) Date of Patent: *Mar. 29, 2016

(54) MANAGING A TEMPLATE IN AN OPERATOR GRAPH

(71) Applicant: International Business Machines Corporation, Armonk, NY (US)

(72) Inventors: Bin Cao, Rochester, MN (US); Jessica R. Eidem, Rochester, MN (US); Brian R. Muras, Rochester, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/136,005

(22) Filed: Dec. 20, 2013

(65) Prior Publication Data

US 2015/0128135 A1 May 7, 2015

Related U.S. Application Data

(63) Continuation of application No. 14/069,688, filed on Nov. 1, 2013.

(51) Int. Cl.
*G06F 17/30* (2006.01)
*G06F 9/455* (2006.01)

(52) U.S. Cl.
CPC ...... *G06F 17/30958* (2013.01); *G06F 9/45533* (2013.01); *G06F 17/30516* (2013.01)

(58) Field of Classification Search
CPC ............... G06F 17/30516; G06F 17/30286; G06F 17/30442; G06F 17/30958; G06F 11/3409

USPC ......................................................... 707/756
See application file for complete search history.

(56) References Cited

U.S. PATENT DOCUMENTS

| | | |
|---|---|---|
| 7,613,848 B2 | 11/2009 | Amini et al. |
| 7,644,110 B2 | 1/2010 | Nishizawa et al. |
| 8,069,190 B2 | 11/2011 | McColl et al. |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Thanh-Ha Dang
(74) *Attorney, Agent, or Firm* — Scott A. Berger; James R. Nock

(57) ABSTRACT

Embodiments of the disclosure provide a method, system, and computer program product for managing a template on an operator graph. The method for managing a template on an operator graph can include receiving the template for processing a stream of tuples. The template can have a plurality of template elements operating on one or more computer processors. The method can include calculating a resource requirement of a template element from the template. The method can include calculating a resource availability of a virtual machine. The method can include allocating the template onto the operator graph. The operator graph can have a plurality of processing elements operating on one or more computer processors. The method can also include mapping the template element from the template onto the virtual machine as a function of the resource requirement of the template element and the resource availability of the virtual machine.

20 Claims, 13 Drawing Sheets

(56) References Cited

U.S. PATENT DOCUMENTS

| | | | |
|---|---|---|---|
| 8,095,690 B2 | 1/2012 | Kashiyama et al. | |
| 8,910,156 B1* | 12/2014 | Kenchammana-Hosekote | G06F 9/45533 718/1 |
| 2008/0263258 A1* | 10/2008 | Allwell | G06F 9/461 711/6 |
| 2009/0228883 A1* | 9/2009 | Gebhart | G06F 9/45533 718/1 |
| 2009/0313400 A1* | 12/2009 | Amini | H04L 29/06027 710/29 |
| 2011/0213609 A1* | 9/2011 | Cowen | G06F 8/34 704/9 |
| 2012/0005236 A1* | 1/2012 | Deng | G06F 8/10 707/798 |
| 2012/0066184 A1* | 3/2012 | Barsness | G06F 17/30516 707/687 |
| 2012/0179809 A1* | 7/2012 | Barsness | G06F 17/30516 709/224 |
| 2012/0216014 A1* | 8/2012 | Branson | G06F 15/17325 712/25 |
| 2012/0218268 A1 | 8/2012 | Accola et al. | |
| 2013/0031124 A1 | 1/2013 | Santosuosso et al. | |
| 2013/0111034 A1* | 5/2013 | Upadhya | 709/226 |
| 2013/0125230 A1* | 5/2013 | Koponen | H04L 41/0823 726/13 |
| 2013/0198318 A1* | 8/2013 | Branson | G06F 9/44 709/217 |
| 2013/0232497 A1* | 9/2013 | Jalagam | G06F 9/5072 718/104 |
| 2014/0344817 A1* | 11/2014 | Jovanovic | G06F 9/5066 718/102 |

OTHER PUBLICATIONS

Cao et al, "Managing a Template in an Operator Graph," U.S. Appl. No. 14/069,688, filed Nov. 1, 2013.

Mell et al., "The NIST Definition of Cloud Computing", National Institute of Standards and Technology, NIST Special Publication 800-145, Sep. 2011, Gaitersburg, MD.

* cited by examiner

MANAGING A TEMPLATE IN AN OPERATOR GRAPH

CROSS-REFERENCE TO RELATED APPLICATIONS

This application is a continuation of co-pending U.S. patent application Ser. No. 14/069,688, filed Nov. 1, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data.

The method for managing a template in an operator graph can include receiving the template for processing a stream of tuples. The template can have a plurality of template elements operating on one or more computer processors. The method can include calculating a resource requirement of a template element from the template. The method can include calculating a resource availability of a virtual machine. The method can include allocating the template onto the operator graph. The operator graph can have a plurality of processing elements operating on one or more computer processors. The method can also include mapping the template element from the template onto the virtual machine as a function of the resource requirement of the template element and the resource availability of the virtual machine.

The system for managing a template in an operator graph can include one or more compute nodes. The compute node can host a plurality of processing elements and the compute node can be supported by a plurality of virtual machines operating on one or more computer processors. The compute node can be configured to processes the attributes from the stream of tuples, and receive a template having a plurality of template elements operating on one or more computer processors onto the operator graph. The system can include a stream manager configured to allocate a template onto an operator graph that is assigned to the plurality of processing elements. The stream manager can also be configured to calculate a resource requirement of a template element from the template. The system can include a virtualization manager configured to calculate a resource availability of the virtual machine that supports the compute node. The virtualization manager can be configured to map the template element from the template onto the virtual machine as a function of the resource requirement of the template element and the resource availability of the virtual machine.

BRIEF DESCRIPTION OF THE DRAWINGS

Like reference numbers and designations in the various drawings indicate like elements.

DETAILED DESCRIPTION

Figure 1:
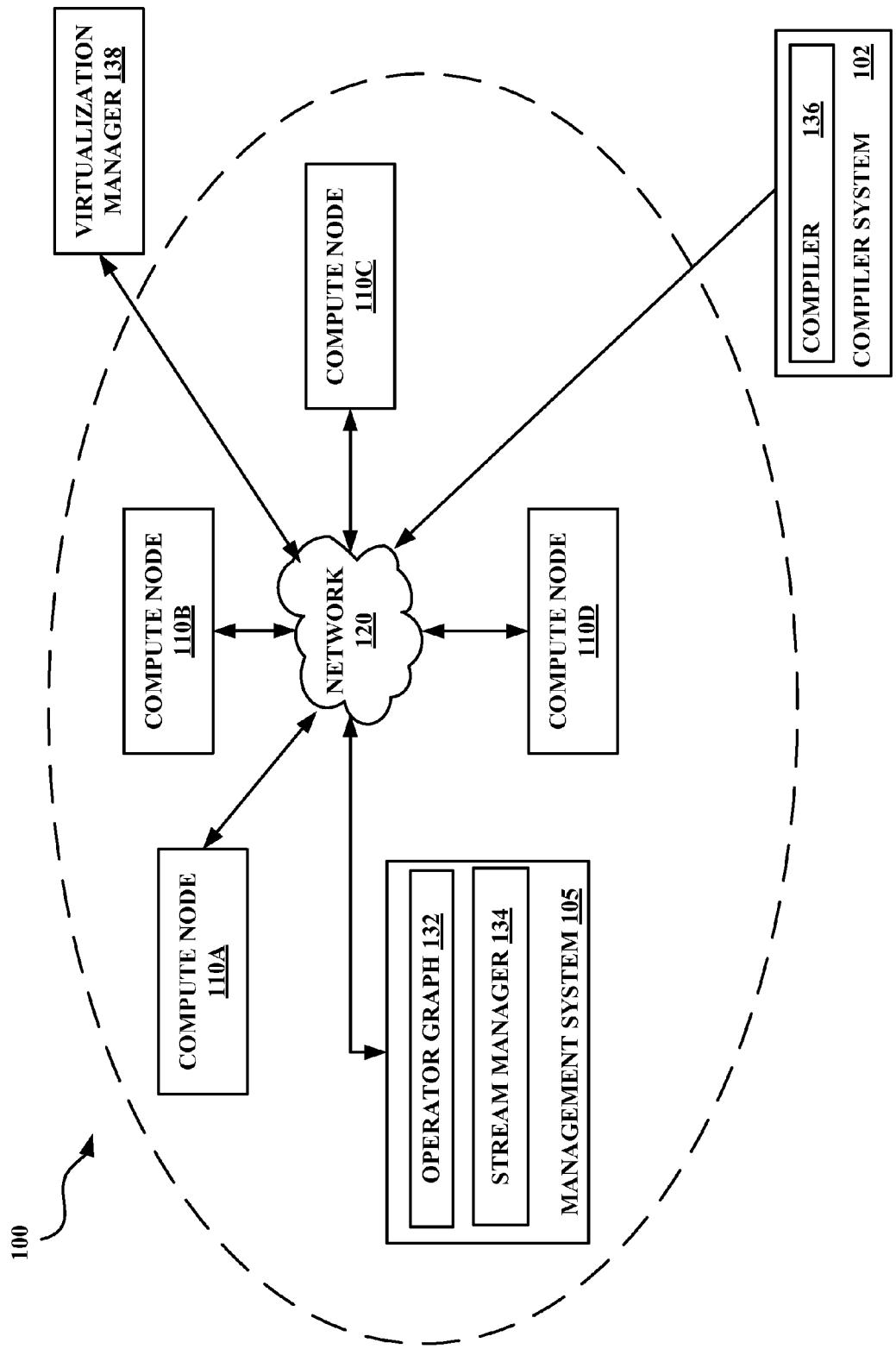
FIG. 1 illustrates a computing infrastructure configured to execute a stream computing application according to various embodiments.

Aspects of the present disclosure are generally directed to managing the hosting of a template that includes one or more template elements in a cloud computing environment. The template elements can include processing elements or stream operators. The template or template elements can be assigned to one or more virtual machines in the cloud computing environment based on the proximity to other processing elements in an operator graph. (This is not always the case—proximity is just one metric. Since we are talking about a distributed cloud cluster—a distributed assignment should be a common use case—once all possible insertion points are determined, the optimal option is picked as a placement algorithm—this could be based on network latency, security, or host stability for example) Although not necessarily limited thereto, embodiments of the present disclosure can be appreciated in the context of streaming data and problems relating to mapping the template elements to virtual machines in a cloud computing environment. Throughout this disclosure, the term template elements can generically refer to a processing element or a stream operator used in a template. Abbreviations used can include "S.O." or "OP" for stream operator, PE for processing element, and VM for virtual machine.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

A plurality of stream operators or processing elements can be saved in order to form a template. The template is a set of stream operators or processing elements that performs the set of actions present in the stream operators or processing elements. For example, an averaging template can have a counting stream operator to count the number of tuples, an aggregate stream operator to add the attribute values of the tuples, and an averaging stream operator to divide the sum of the attributes by the number of tuples. Taken as a whole, the averaging template can be inserted into an operator graph whenever an average is required. An aspect of this disclosure also allows elements of the template, e.g., stream operators and processing elements, to be mapped to cloud computing elements, e.g., virtual machines. The template can be further reused on different cloud environments. For example, the template can be originated from one type of cloud computing environment and be deployed on another cloud computing environment. The reallocation of the template can be environment-agnostic.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120. The compute nodes 110A-110D can be a hardware resource that supports the operation of the processing of the stream of tuples. The compute nodes 110A-110D can also be the hardware resources for a cloud computing environment. As discussed herein, the the compute nodes 110A-110D can also be the virtualization platform for virtual machines.

Figure 3:
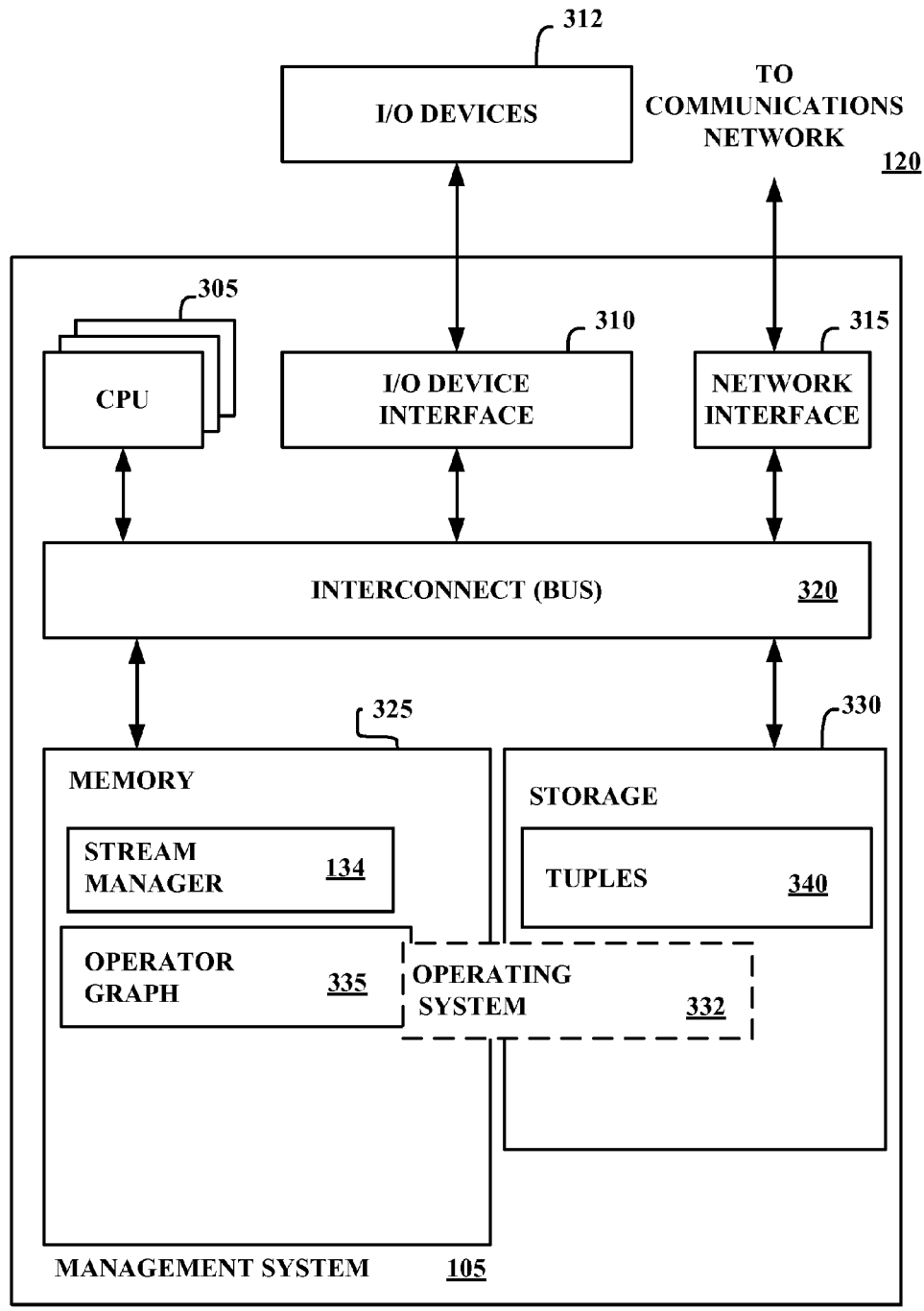
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can manage the processes from the operator graph, including anything associated with the operator graph 132. In various embodiments, the stream manager 134 can be responsible for the insertion of a template into the operator graph and creating the processing elements and stream operators that insert into the operator graph 132 at an insertion point. The insertion point can be the point in the operator graph 132 where the template is deployed. The template can be deployed before an operator graph, in the middle of an operator graph, or at the end of an operator graph.

The communications network 120 may include a variety of types of physical communication channels or "links" The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

The computing infrastructure 100 can also have a virtualization manager 138. The virtualization manager 138 can be responsible for the assignment of processing elements to specific virtual machines on the compute nodes 110A-110D. The virtualization manager 138 can be distinct from the stream manager 134 in that the virtualization manager 138 can manage the compute nodes and the assignment of a processing element to a virtualized hardware element. An aspect of this disclosure is to avoid the compiling of an operator graph whenever the compute nodes are reassigned to another stream operator or processing element.

Figure 2:
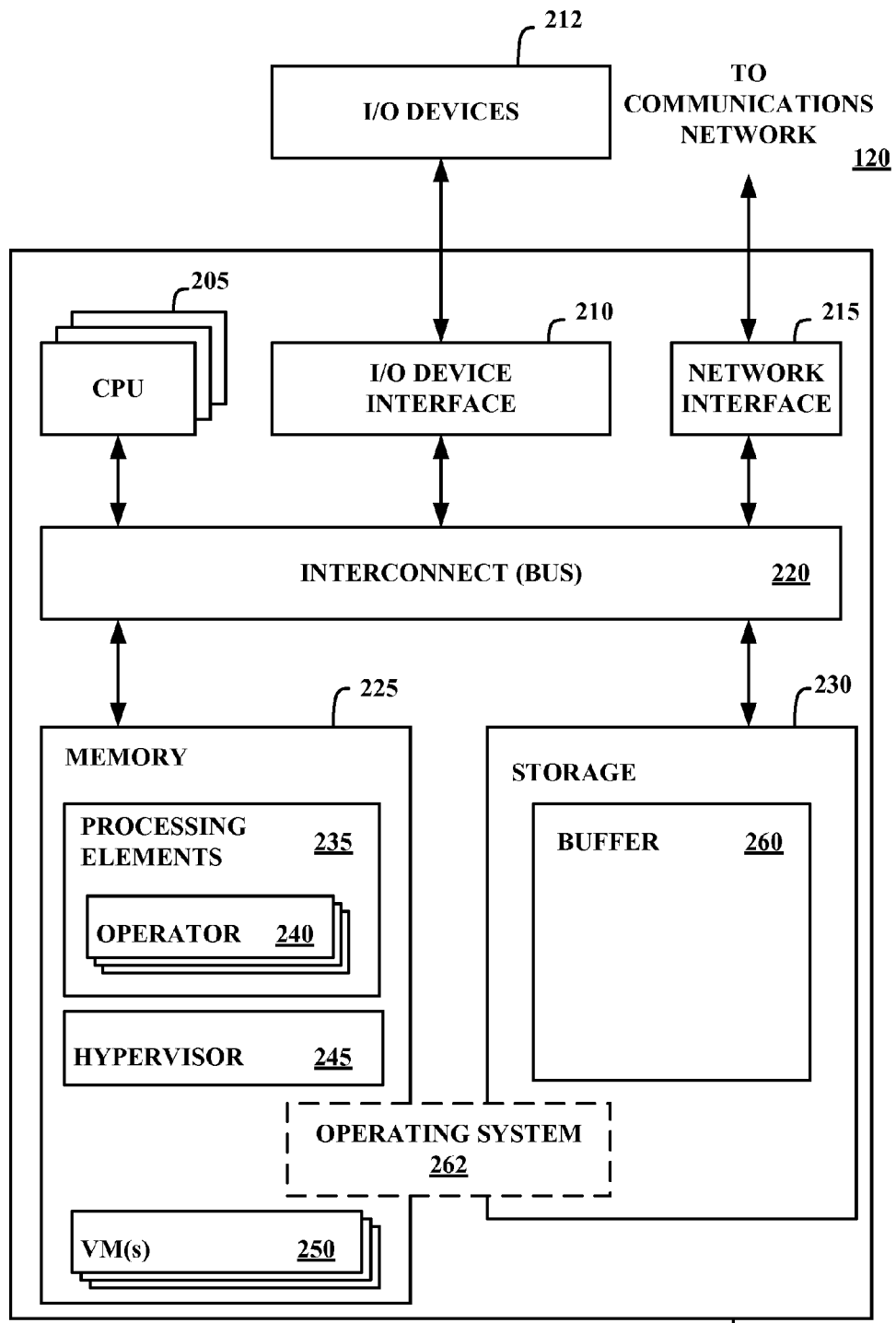
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A compute node 110 can be configured to have a hypervisor 245. The hypervisor 245 can be configured to distribute the hardware elements, e.g., the CPUs 205, the memory 225, the storage 230, to the virtual machines 250. The hypervisor 245 can run as a separate program or be imbedded into the firmware of the compute node 110. The virtual machine 250 can replicate the experience of a standalone compute node to a variety of users without degrading performance. Due to spikes in demand, the hypervisor 245 can be configured to dynamically distribute the hardware resources to the virtual machine where the hardware resources of the compute node are most demanded.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that manage the stream of tuples through operator graph 335. According to various embodiments, an operator graph 335 can run in memory 325 and the corresponding data tuples 340 can be processed and stored in databases associated with the storage element 330. The stream manager 134 can also require a database when reading or writing from storage 330 and logging from storage 330.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
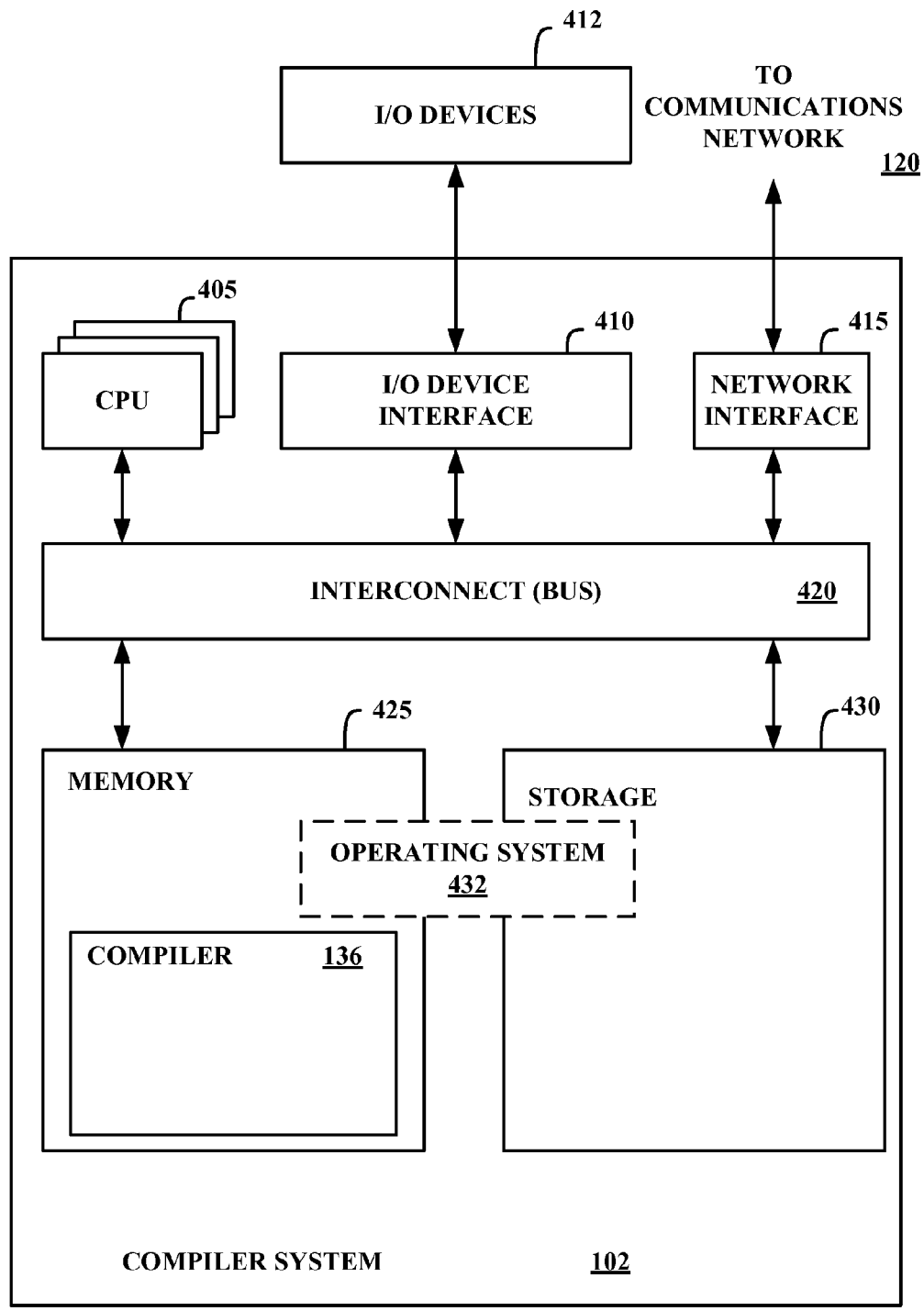
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the windowing operation on a particular stream operator on the operator graph 335 during compile time by writing the windowing operation onto a particular stream operator. In various embodiments, the windowing operation may be included as a default and activated from the stream manager 134. The windowing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
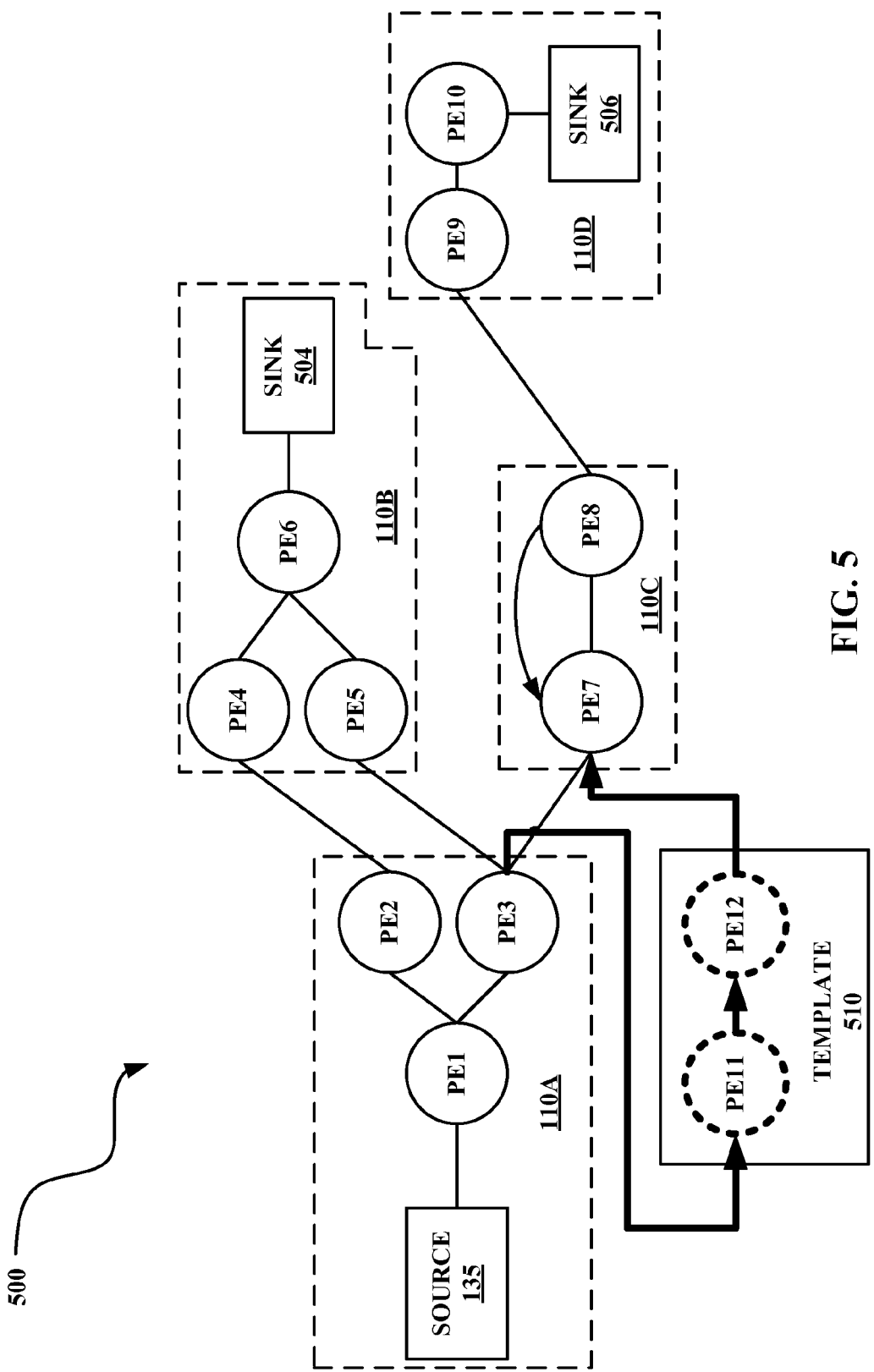
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

According to various embodiments, the template can be an separate operator graph and would not need to be inserted into another operator graph to function. If the template is a separate operator graph, then the template would need a source and a sink to function. In various embodiments, the template can include at least one stream operator or processing element. A template 510 can be inserted into the operator graph 500. The template 510 can have two or more processing elements, PE11 and PE12. For illustration purposes, the template 510 has an insertion point between PE3 and PE7. The insertion point is the point where the template is inserted in the operator graph 500. During the insertion of the template 510, the existing communication between PE3 and PE7 is severed. The output port of PE3 is coupled to the input port of PE11 and the output port of PE12 is coupled to the input port of PE7. The template receives the stream of tuples from PE3 and processes the stream of tuples before sending the stream of tuples to PE7. The processing elements of the template, PE11 and PE12, can be assigned to virtual machines according to the process described herein.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
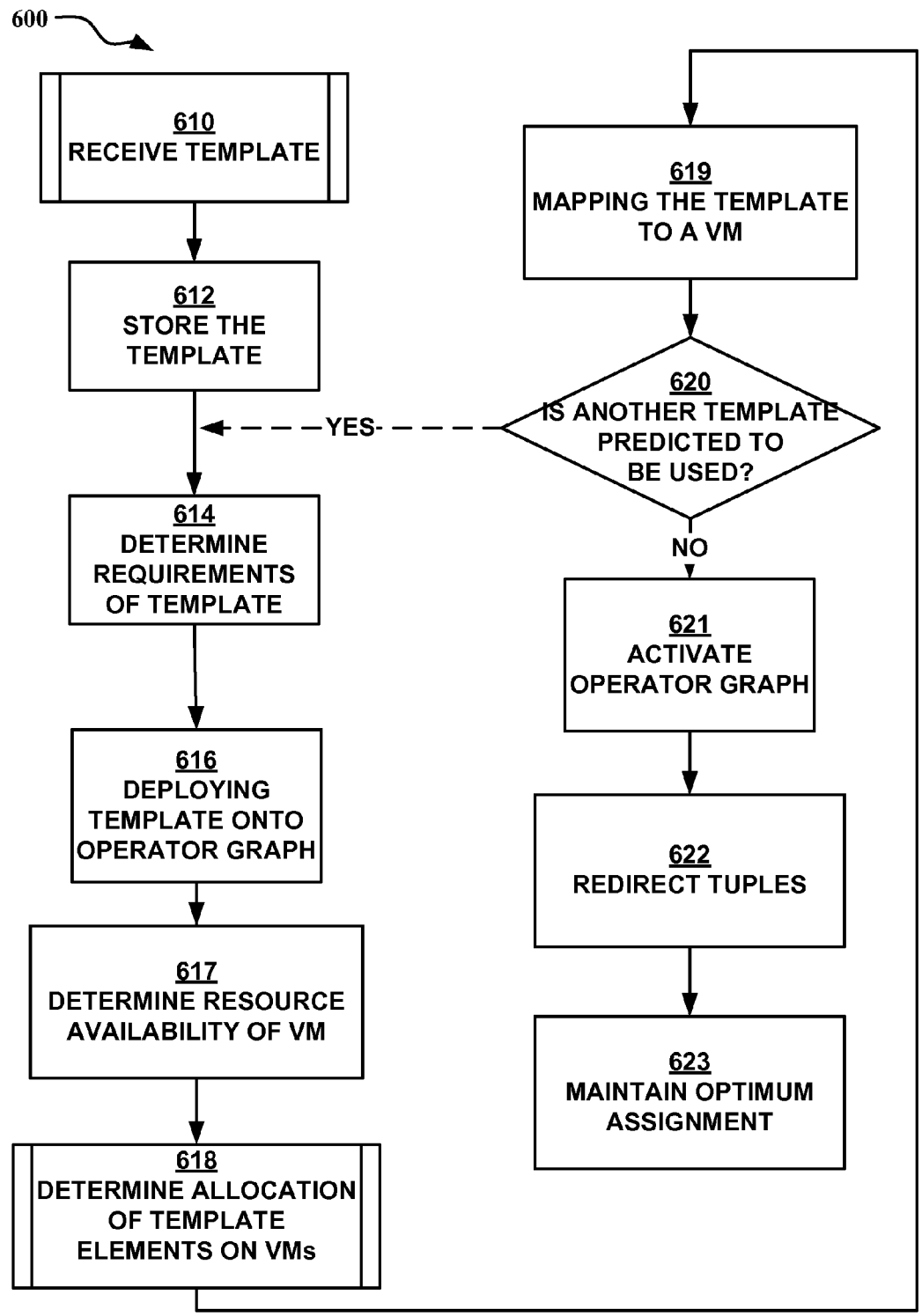
FIG. 6 illustrates a flowchart of a method for assigning a template to a virtual machine, according to various embodiments.

FIG. 6 illustrates a flowchart of a method 600 for assigning a template to a virtual machine, according to various embodiments. Generally, the method 600 can involve receiving the template and determining a resource requirement of the template. The resource requirement can measure the hardware resources required by the template elements. The hardware resources requirement can be defined by Extensible Markup Language (XML) Instructions from an Open Virtualization Format (OVF) package, according to various embodiments. The method 600 can also involve determining the resource availability of virtual machines on the compute node and mapping the template elements based on the availability. The method 600 can begin at operation 610.

In operation 610, the stream manager can receive the template. The template can be created based on administrator preferences or can be captured from an existing operator graph using a variety of methods described herein. The template can be saved in a prior operation to a storage system or memory and retrieved by the stream manager. After the template is received the method 600 can continue to operation 612.

In operation 612, the stream manager can store the template. The template can be stored in a temporary cache within the memory. In various embodiments, the template can be stored in a management node that caches the template until it is used. The storage of the template can be bypassed if the template is requested by the stream manager, according to various embodiments. After the template is stored, then the method 600 can continue to operation 614.

In operation 614, the streams manager can determine the hardware resource requirements, or resource requirement, of the template. The resource requirement can represent the amount of hardware resources needed to operate the template. The resource requirement can be based on the template elements. For example, if there is an averaging template, then the hardware requirements would be the total processing demand of the aggregating stream operator, the counting stream operator, and the averaging stream operator. The resource requirement can be determined for the template elements or aggregated for the entire template depending on the streaming application policy.

The hardware resource requirements can be predicted based off of the history of the template. For example, if the template in past usages required 1000 CPU cycles/second and 4 MB of memory, then the stream manager can predict a similar demand from the hardware resources. After the resource requirement of the template is determined, then the method 600 can continue to operation 616.

In operation 616, the stream manager can deploy the template onto the operator graph. The deployment can involve the stream manager loading binaries of the template to deploy the operator graph.

During the deployment, the stream manager can match the output of the stream operator or processing element upstream from the insertion point, to the input of the template and the output of the template to the input of another a stream operator or processing element downstream of the insertion point. In various embodiments, the stream manager can determine whether the deployment of the template will be permissible or impermissible. An impermissible deployment can be the result of the template being incompatible with the input and output at the insertion point. In various embodiments, an impermissible deployment can also result in a processing bottleneck, e.g., if the template involves searching an external database. If the template deployment is impermissible, then the stream manager can alert the streaming application.

An impermissible deployment can also be the result of the hardware requirement determination in operation 614. For example, a template that requires facial recognition of inputted images could potentially take up a large amount of computing power beyond a threshold set by the streaming application. The deployment of the facial recognition template could be denied or delayed by the stream manager.

The stream manager can also visually depict a permissible and impermissible deployment. For example, deploying a template that omits redundant attributes where the input port of the template is fed by a stream operator that takes a sum, and the output port of the template leads to a stream operator that produces a count, can result in a permissible deployment. The stream manager can indicate that the deployment is permissible visually. On the other hand, an impermissible deployment can be a template that takes an average of numerical values deployed between a stream operator that records transcripted license plates, and a stream operator that searches a third-party license plate database.

In various embodiments, the deployment can involve loading the binaries of the stream operators. The binaries can be whatever is compiled by the compiler to be deployed as an operator graph and can include interpreted code written in Java®. After the template is deployed onto the operator graph, the method 600 can continue to operation 617.

In operation 617, the virtualization manager can determine a resource availability of the virtual machines and the underlying compute nodes. The resource availability can be the resources available on a virtual machine. In various embodiments, the virtual machine can lack the resources to process a template or template elements. The virtualization manager can keep track of the virtual machines that have available resources to host a template element. After the virtualization manager determines the resource availability of the virtual machines, then the method 600 can continue to operation 618.

In operation 618, the virtualization manager can determine the allocation of template elements on the virtual machines. The template elements can be allocated based on a number of policies, e.g., whether the template is to be on the same compute node, whether the template elements are allowed to be on different compute nodes, etc. Generally, the streaming application can give preference to an allocation that places the entire template with a virtual machine that also supports adjacent processing elements in the operator graph. The allocation of the template elements can be discussed further herein. After the virtual machines are allocated to the virtual machines, then the method 600 can continue to operation 619.

Operation 619 can also include mapping the template and the corresponding template elements to the virtual machines on the cloud computing environment. According to various embodiments, the activation engine of the virtual machine can set up the dependencies with the hardware resources. In various embodiments, the template elements can be mapped to the cloud while the remainder of the operator graph can remain tied to hardware resources or their partitions. The entire operator graph including the template can also be mapped to the cloud network. Additionally, the dependencies can be set up by the activation engine of a virtual machine. After the template is mapped, then the method 600 can continue to operation 620.

In operation 620, the stream manager can determine whether another template is predicted to be used and pre-assign the template elements to virtual machines. For example, if a past performance indicates that a second template is used 90% of the time in conjunction with a first template, and there is no second template at the presence of the first template, then the second template can be predicted to be used. The pre-assignment can be used to increase the speed of using multiple templates. According to various embodiments, the pre-assignment can be an optional step. If the template is predicted to be used, then the method 600 can continue to operation 614, where the requirements of the template are determined. Operation 614-616 can be a simulated process for the predicted template. The stream manager can call on the template if the template is deployed. If there is not another template that is predicted to be used or if template prediction is not used, then the method 600 can continue to operation 621.

In operation 621, the stream manager can activate the operator graph that includes the template. According to various embodiments, the stream manager can notify the processing elements upstream and downstream of the template that the mapping to cloud resources is complete before the activation. When activated, the operator graph is not required to be recompiled. During activation, the operator graph can process the stream of tuples according to the processing elements. After the operator graph is activated, then the method 600 can continue to operation 622.

In operation 622, the stream manager can redirect the flow of tuples to include the template. The template can perform additional processing on the stream of tuples. For example, before the template is added, the tuples can be processed with a particular result. If a template that saves part of the stream of tuples into an external database is activated, then the operator graph can save part of the stream of tuples to an external database in addition to obtaining the particular result. After the tuples are redirected, then the method 600 can continue to operation 623.

In operation 623, the stream manager can monitor the operator graph and the virtualization manager can monitor the underlying virtual machines to determine and maintain the optimal assignment of processing elements to virtual machine. The virtualization manager can modify the assignment of processing elements to virtual machines. For example, if a processing element is encountering a large processing workload, then the previous mapping to a virtual machine may not be sufficient and the virtualization manager can increase the processing resources given to the processing element by mapping the processing element to another virtual machine or increasing the hardware resources for the existing virtual machine.

The template can be used until the application does not require the template any longer. The stream manager can determine whether the template should still be used. The template can be discarded or saved after every use. The template can be removed by removing the template image from image repository. The stream manager can also reconvert or capture any templates back to the image repository.

Figure 7:
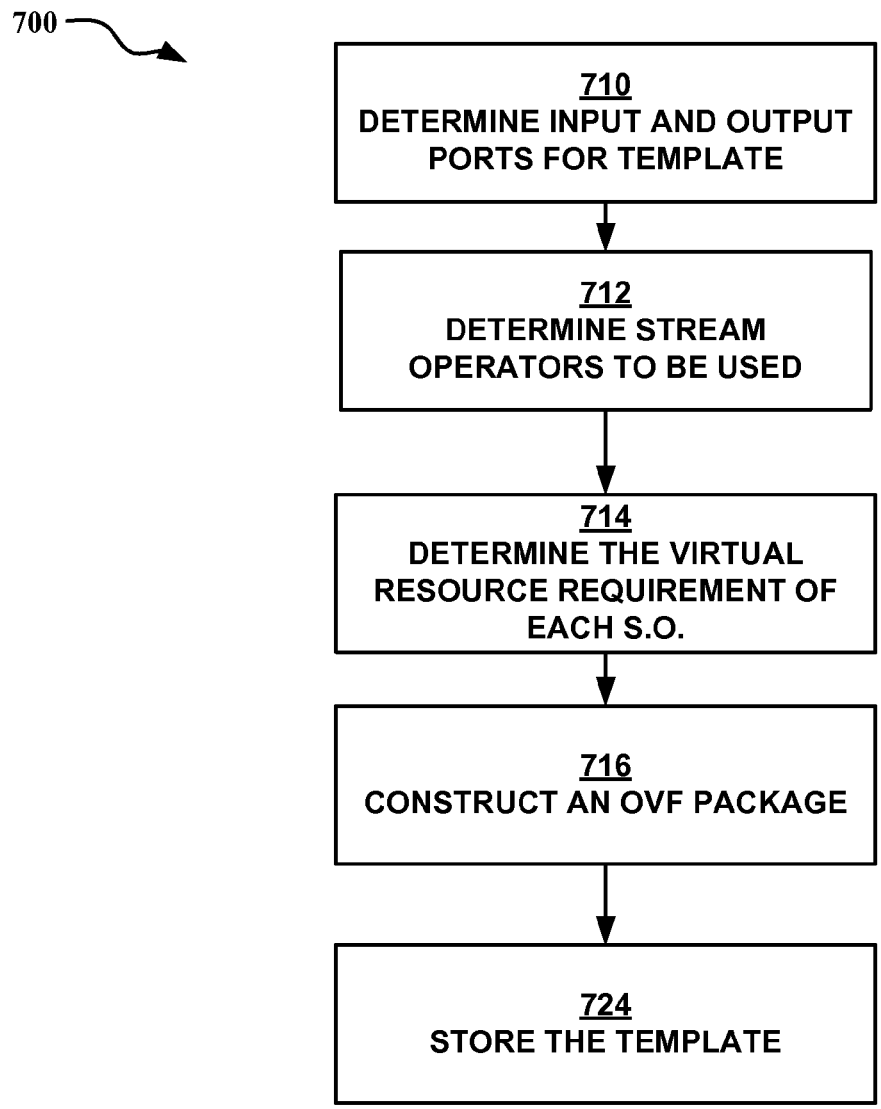
FIG. 7 illustrates a flowchart of a method of creating a template, according to various embodiments.

FIG. 7 illustrates a flowchart of a method 700 of creating a template, according to various embodiments. The method 700 can provide a template for operation 610 from FIG. 6. The template can be created by the stream manager and stored in either long-term storage, e.g., a hard drive, or short-term storage, e.g., volatile memory. The resulting template can be transmitted directly or retrieved from storage by the stream manager for deployment in operation 610 in FIG. 6. The method 700 can begin at operation 710.

In operation 710, the input and output ports of the template can be determined by the streaming application. For example, the input for the template can be defined by the streaming application as a stream of tuples related to cars collected from a traffic camera at a tollbooth. Thus, the input can be defined as image files and laser counter readings and the output can be a listing of car counts sorted by color. After the input and output ports of the template are determined, then the method 700 can continue to operation 712.

In operation 712, the stream manager can determine the stream operators to be used. For example, if the template is performing an averaging function, then the template can have a counting stream operator and an aggregating stream operator. The stream manager can also determine the flow of the stream operators. The flow can refer to the flow of streaming data through the template. After the stream operators are determined, then the method 700 can continue to operation 714.

In operation 714, the virtual resource requirement of each stream operator in the template can be determined. Each stream operator can require a particular amount of hardware support that can be provided by a virtual machine. The stream manager can determine that a stream operator will require a certain number of processor cycles to process each tuple. After the virtual resource requirement is determined, then the method 700 can continue to operation 716.

In operation 716, the stream manager can construct an Open Virtualization Format (OVF) package for the template. The template can also be in an (OVF). The OVF is an open standard for packaging and distributing virtual appliances or more generally software to be run in virtual machines. The OVF package can include an OVF descriptor. The OVF descriptor is an Extensible Markup Language (XML) file which describes the packaged virtual machine; it contains the metadata for the OVF package, such as name, hardware requirements, references to the other files in the OVF package and human-readable descriptions. In addition to the OVF descriptor, the OVF package will typically contain one or more disk images, and optionally certificate files and other auxiliary files. Once the OVF package is created, then the method 700 can continue to operation 724.

In operation 724, the stream manager can store the template in the memory or storage for later retrieval. According to various embodiments, the templates can be transmitted from the memory or storage upon request from the stream manager in operation 610 in FIG. 6.

Figure 8:
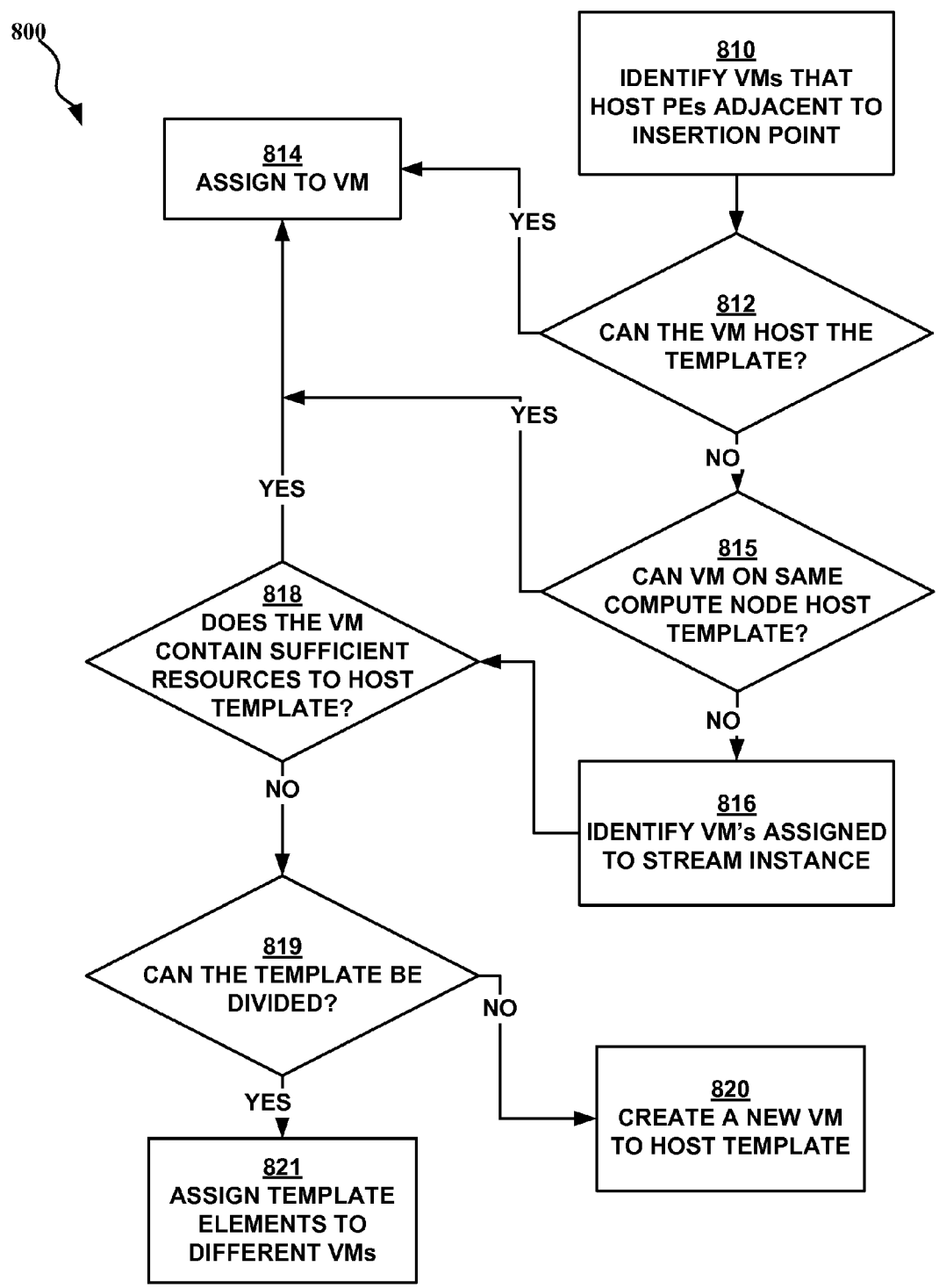
FIG. 8 illustrates a method of determining the allocation of resources on virtual machines.

FIG. 8 illustrates a method 800 of determining the allocation of resources on virtual machines. The method 800 can correspond to operation 618 of FIG. 6. According to various embodiments, the method 800 can assign template elements to particular virtual machines based on the location of the insertion point on the operator graph. The template elements can generally be assigned to virtual machines that host adjacent processing elements in order to minimize the delay associated with a network. The method 800 can begin at operation 810.

In operation 810, the virtualization manager can identify virtual machines that host or support processing elements adjacent to the insertion point. As mentioned previously, the insertion point is where the template is inserted into the operator graph. There may be more than one processing element adjacent to the insertion point, with each adjacent processing element being hosted by a different virtual machine. According to various embodiments, the virtualization manager can identify the processing elements with sufficient resource availability as determined in operation 617 from FIG. 6.

The term adjacent can be flexible. For example, there may be a first order processing element immediately adjacent to the insertion point and a second order processing element adjacent to the first order processing element but not to the insertion point.

The virtualization manager can monitor the processing element adjacent to the insertion point to determine the virtual machine that hosts the processing element. For example, at the insertion point, an upstream processing element from the insertion point can be supported by a first virtual machine and a downstream processing element from the insertion point can be supported by a second virtual machine. The virtualization manager can also examine the second order upstream and downstream processing elements for virtual machines that support the processing element. After the virtual machines are identified, then the method 800 can continue to operation 812.

In operation 812, the virtualization manger can determine whether the virtual machine that supports the adjacent processing element contains sufficient resources to host the template. According to various embodiments, if the adjacent processing elements are supported by different virtual machines, then the virtualization manager can select the virtual machine using a variety of techniques. For example, if the virtual machine supporting the adjacent processing element has more resources than another virtual machine, then the virtual machine with the most resources can be selected. If the virtual machine can host the template, then the method 800 can continue to operation 814. In operation 814, the template elements can be assigned to the virtual machine by the virtualization manager. If the virtual machine does not have sufficient resources, then the method 800 can continue to operation 815.

In operation 815, the virtualization manager can determine if the compute nodes or hardware resources supporting the virtual machine with the adjacent processing element have any virtual machines with available resources to support the template. An example of how a virtual machine is selected from the same compute node can be described herein. If a virtual machine on the same compute node other than the virtual machine supporting the adjacent processing element can host the template, then the method 800 can continue to operation 814 where the template element is assigned to the virtual machine on the same compute node. If the virtual machine on the same compute node cannot host the template, then the method 800 can continue to operation 816.

In operation 816, the virtualization manager can identify virtual machines that support processing elements in the stream instance. The processing elements in the streams instance can include the one or more operator graphs operating at a particular time. The virtualization manager can give priority to virtual machines supporting processing elements in the particular operator graph where the insertion point is located over the virtual machine supporting processing elements in other operator graphs. According to various embodiments, the virtualization manager can also look beyond virtual machines assigned to the stream instance. For example, the virtualization manager can identify any virtual machine on a distributed cloud environment that meets the streams template requirements, e.g., network, policies, resources, performance, etc. Once the virtual machine is identified, the method 800 can continue to operation 818.

In operation 818, the virtualization manager can determine whether any virtual machine that supports a processing element from the streams instance contains sufficient resources to host a template. If so, then the method 800 can continue to operation 814. If there are not sufficient resources, then the method 800 can continue to operation 819.

In operation 819, the virtualization manager and stream manager can determine whether the template elements in the template can be separated onto different virtual machines. The streaming application can have a policy that allows the separation of templates and a policy directed towards keeping the template on the same compute node. Thus, the streaming application can favor keeping the template on the same compute node, even if the template elements are hosted on different virtual machines. As described herein, the virtualization manager can also allow template elements to be divided across different compute nodes. In the event of template element divided across different nodes, the virtualization manager can determine the most efficient layout. If the template can be divided, then the method 800 can continue to operation 821. If the template cannot be divided, then the method 800 can continue to operation 820.

In operation 820, the virtualization manager can create a new virtual machine to host the template if the virtual machine contains insufficient resources to host a template and the template cannot be divided. According to various embodiments, the virtualization manager can also assign the template to an existing virtual machine outside of the streams instance. Creating a new virtual machine has an advantage of maintaining data security within the instance environment.

In operation 821, the template elements can be assigned to different virtual machines. In various embodiments, the template elements can be assigned to virtual machines supported by the same compute nodes or different compute nodes in the same instance. The assignment to different virtual machines can be described herein.

Figure 9:
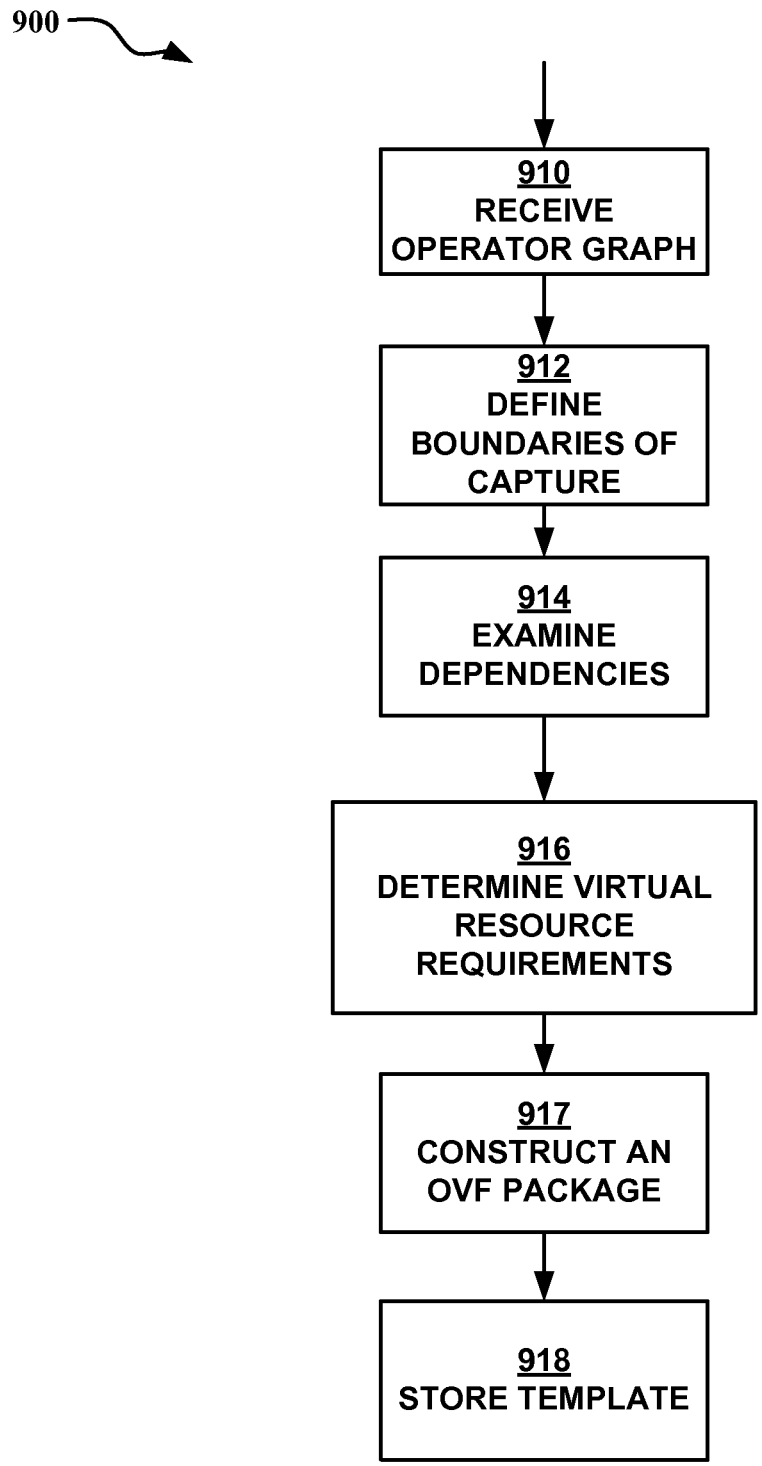
FIG. 9 illustrates a method of capturing a portion of the operator graph into a template, according to various embodiments.

FIG. 9 illustrates a method 900 of capturing a portion of the operator graph into a template, according to various embodiments. The template produced by the method 900 can be saved in memory or storage and received by the stream manager in operation 610 in FIG. 6. The method 900 can begin at operation 910.

In operation 910, the stream manager can receive the operator graph. The operator graph can be processing a stream of tuples. In operation 912, the streaming application can define the template elements that will be captured in the template. In operation 914, the dependencies of the template elements can be further examined to determine the hardware resources that are assigned to each template element. In operation 916, the virtualization manager can determine the virtual resource requirements of the template element. In operation 917, the stream manager can construct an OVF package similar to operation 716 in FIG. 7. In operation 918, the template can be stored in the storage or memory until accessed by the stream manager.

Figure 10A:
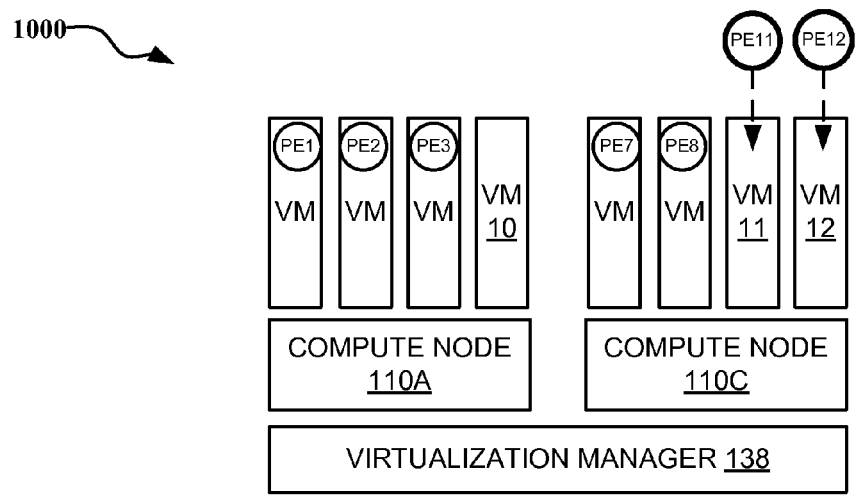
FIG. 10A illustrates a system of assigning processing elements to virtual machines, according to various embodiments

FIG. 10A illustrates a system 1000 of assigning processing elements to virtual machines, according to various embodiments. The system 1000 can work in conjunction with the template assignment FIG. 5. Once the template with PE11 and PE12 is deployed in FIG. 5, then as discussed in operation 810 in FIG. 8, the virtual machines that support the processing elements adjacent to the insertion point can be determined. The processing elements adjacent to the insertion point are PE3 and PE 7. PE3 is supported by compute node 110A and PE7 is supported by compute node 110C.

The system 1000 can have a host 110A, and 110C which can be the same as a compute node. The hosts 110A, 110C can be controlled by the virtualization manager 138. The virtualization manager 138 can monitor the compute nodes 110A and 110C and create, migrate, or destroy virtual machines on the compute nodes. While four virtual machines are shown on each compute node 110A, 110C, more virtual machines are possible.

Assuming that each virtual machine can support only one processing element, the virtual machine supporting PE3 and PE 7 does not have processing resources available for the processing elements PE11 and PE12. Since there are not processing resources available on the same virtual machine that supports PE3 and PE7, then the system 1000 can look at the compute nodes that support PE3 and PE7, i.e. compute node 110A and compute node 110C. The streaming application preferences can indicate that the template elements in the template, e.g., PE11 and PE12, should be kept together and preferably on the same compute node. Since VM10 would not be able to accommodate both PE11 and PE12, then the virtualization manager 138 can assign PE11 and PE12 to VM11 and VM 12.

Figure 10B:
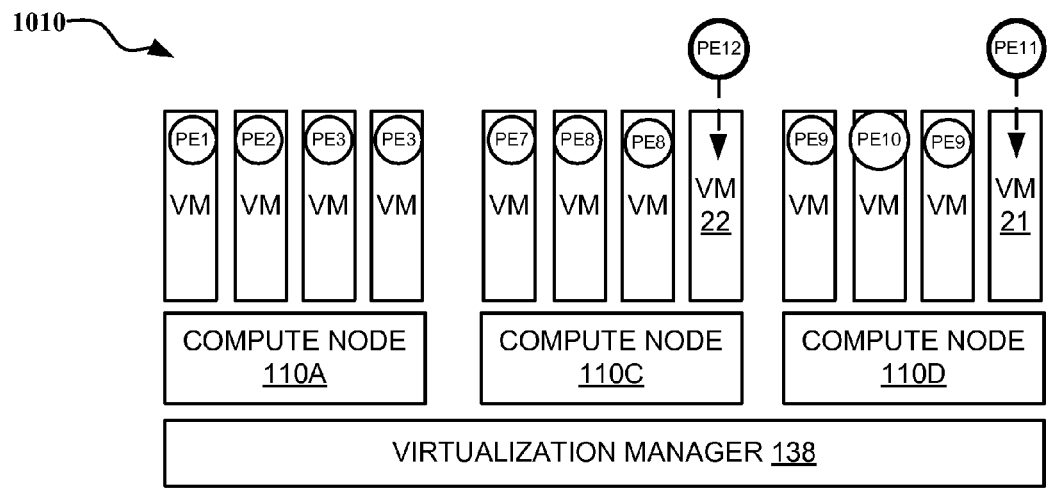
FIG. 10B illustrates a system that assigns template elements to different compute nodes, according to various embodiments

FIG. 10B illustrates a system 1010 that assigns template elements to different compute nodes, according to various embodiments. For the sake of clarity, the virtual machines in the system 1010 are unable to support more than one processing element. The system 1010 can correspond to FIG. 5. After the template is inserted into the insertion point, the template elements PE11, and PE12 can be assigned to virtual machines. The system 1010 can illustrate the process in operation 818 and operation 814 in FIG. 8.

The system 1010 can have compute nodes 110A, 110C, and 110D each supporting a plurality of virtual machines. The virtualization manager 138 can manage the virtual machines on the compute nodes. For the sake of simplicity, the system 1010 depicts each compute node as having four virtual machines. The system 1010 depicts the virtual machines on compute node 110A as not having any available resources to host a template element. Compute node 110C and 110D each have one available virtual machine to host the template element, e.g., VM22 and VM21.

Since there is not a way to host both template elements, PE11 and PE12, on one compute node, then the template elements can be hosted on separate compute nodes. PE11 and PE12 can each be assigned to compute node 110C or compute node 110D. Turning to FIG. 5, the compute node 110D is not adjacent to the insertion point, and does not host any processing elements adjacent to the insertion point. Compute node 110C can receive the output of the template at PE12. The virtualization manager 138 can simulate the hardware path to find the compute node assignment that results in the least amount of traffic.

For example, If PE11 were hosted by compute node 110C, then the path can route from compute node 110A (PE3) to compute node 110C (simulated PE11) to compute node 110D (simulated PE12) to compute node 110C (PE7). Thus, all of the routing can result in a slower processing time because of the increase in traffic on the network. However, if PE12 were hosted by compute node 110C, then the routing can resemble from compute node 110A (PE3) to compute node 110D (simulated PE11) to compute node 110C. Therefore, the system 1010 can assign VM21 to host PE11 and assign VM22 to host PE12.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
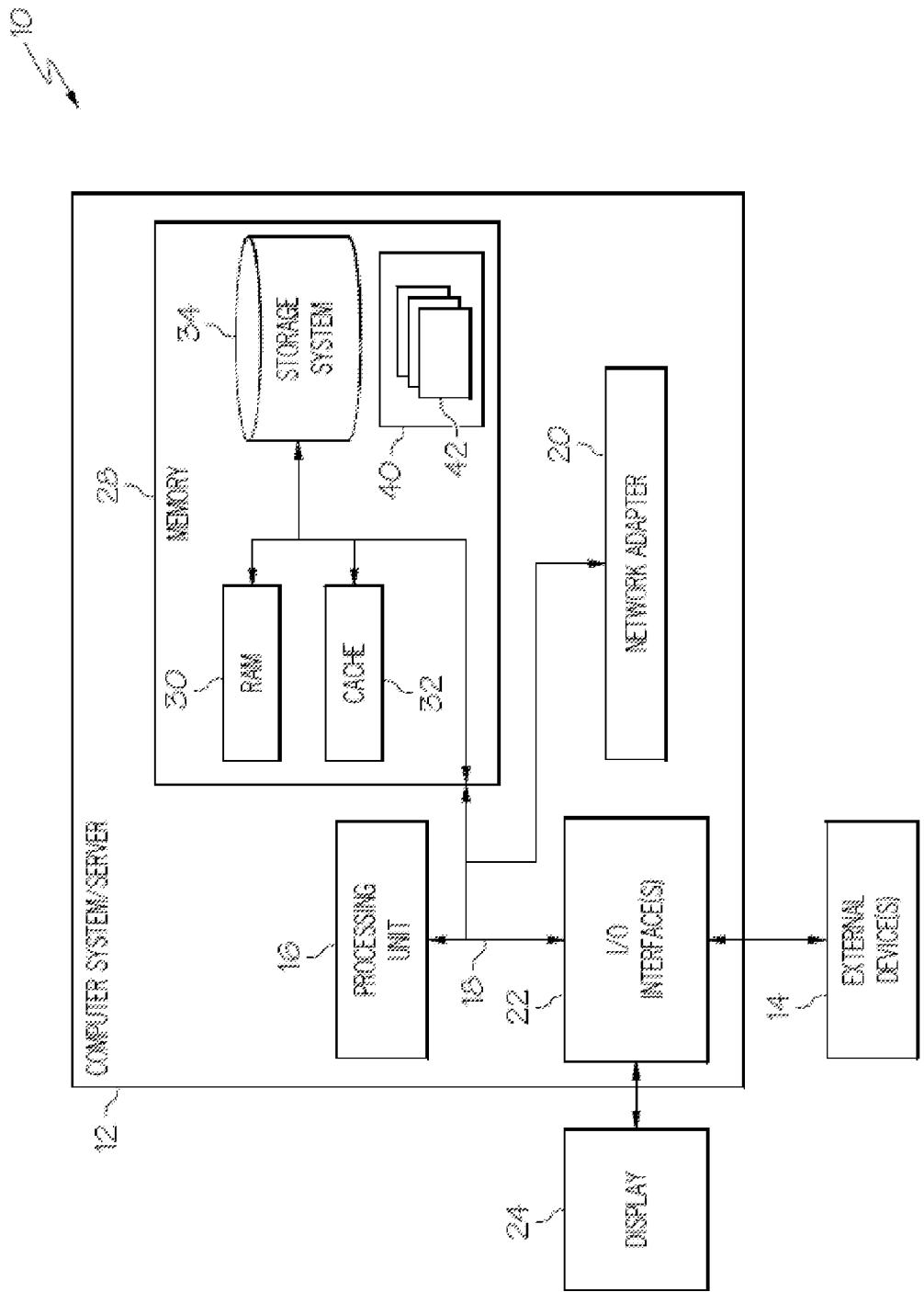
FIG. 11 illustrates a cloud computing node, according to various embodiments.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
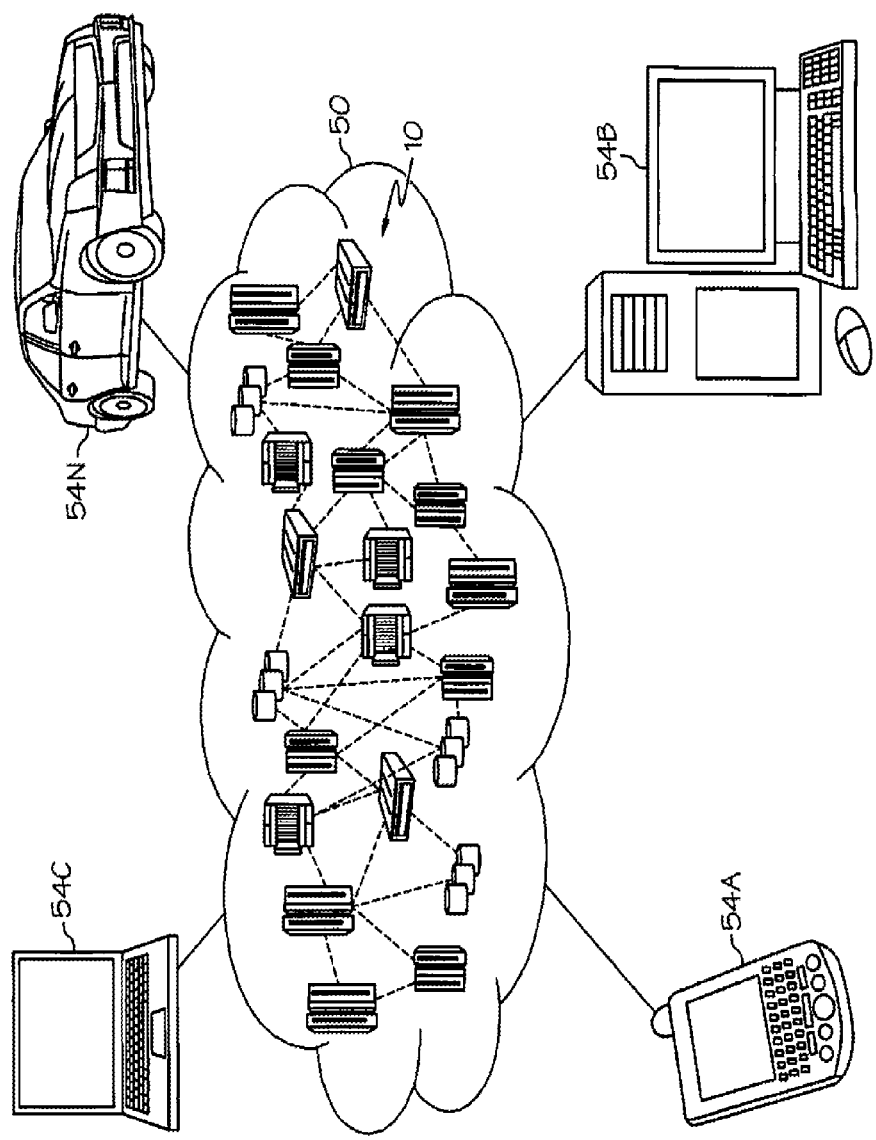
FIG. 12 illustrates a cloud computing environment, according to various embodiments.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 13:
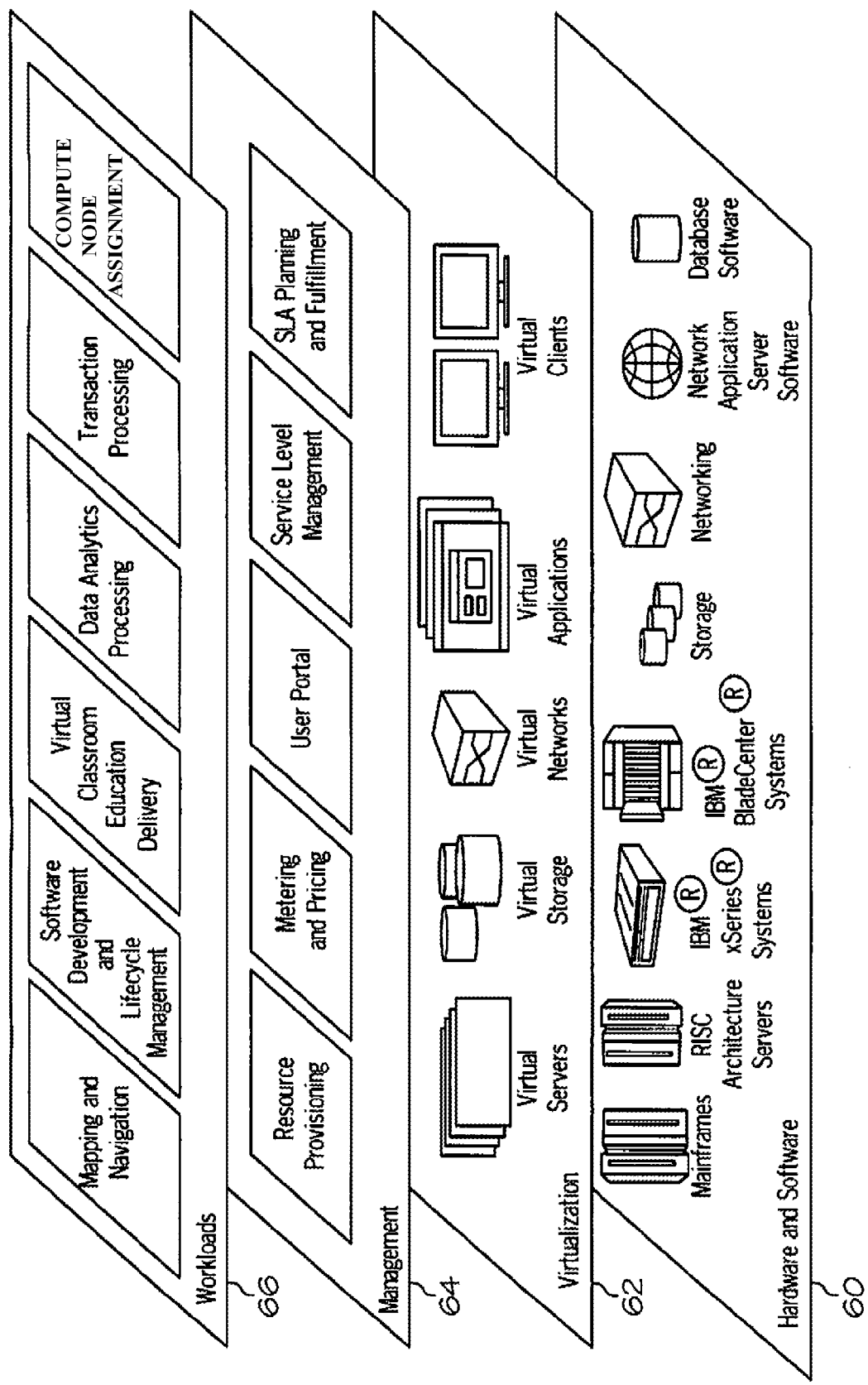
FIG. 13 illustrates abstraction model layers, according to various embodiments.

Referring now to FIG. 13, a set of functional abstraction layers provided by cloud computing environment 50 (FIG. 12) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and compute node assignment to virtual machines.

What is claimed is:

1. A method for managing a template on an operator graph, comprising:
   receiving the template for processing a stream of tuples, the template having a plurality of template elements operating on one or more computer processors, the operator graph having a plurality of processing elements operating on one or more computer processors that perform data processing on the stream of tuples using a first amount of hardware resources, the template performs additional processing on the stream of tuples in relation to the processing performed at the operator graph, and a template element from the plurality of template elements perform a portion of the additional processing;
   calculating a resource requirement of a template element from the template wherein the resource requirement is the amount of hardware resources needed to operate the template in addition to the first amount of hardware resources;
   calculating a resource availability of a virtual machine wherein the resource availability is the resource available on a virtual machine to host the template element;
   allocating the template onto the operator graph, the operator graph having a plurality of processing elements operating on one or more computer processors;
   mapping the template element from the template onto the virtual machine as a function of the resource requirement of the template element and the resource availability of the virtual machine.

2. The method of claim 1, wherein the allocating the template onto an operator graph includes:
   selecting an insertion point between a first processing element and a second processing element from the operator graph; and
   communicatively coupling an output of the first processing element to an input of the template, and an output of the template to an input of the second processing element.

3. The method of claim 2, wherein the second processing element is configured to be a sink of the operator graph.

4. The method of claim 2, wherein the first processing element is configured to be a source of the operator graph.

5. The method of claim 2, further comprising:
   determining that a deployment of the template is permissible.

6. The method of claim 5, wherein the permissible deployment is a result of the template being compatible with the output of the first processing element and the input of the second processing element at the insertion point.

7. The method of claim 5, further comprising:
   displaying the permissible deployment visually.

8. The method of claim 1, wherein the template is created by:
   identifying the template elements to be used,
   determining an input and output ports for the template,
   determining the resource requirement for the processing element, and
   storing the template.

9. The method of claim 8, further comprising:
capturing the template from an existing operator graph.

10. The method of claim 1, wherein the mapping the template element includes:
identifying a virtual machine that supports a processing element adjacent to an insertion point for the template on the operator graph;
determining whether the resource availability of the identified virtual machines is sufficient for the resource requirement for the template element; and
assigning the template element to the virtual machine in response to the resource availability of the identified virtual machine being sufficient for the resource requirement of the template element.

11. The method of claim 10, wherein the identified virtual machines are assigned to a streams instance.

12. The method of claim 10, further comprising:
creating a virtual machine based on the resource requirement of the template element in response to the resource availability of the identified virtual machine being insufficient for the resource requirement of the template element.

13. The method of claim 10, wherein mapping the template element includes:
assigning all of the template elements from the template to the identified virtual machine in response to the resource availability of the identified virtual machine being sufficient for the resource requirement of all the template elements from the template.

14. The method of claim 10, wherein the identified virtual machine is outside of a streams instance that supports the operator graph.

15. The method of claim 1, further comprising:
identifying the resource requirement of a second template, the second template having a plurality of template elements; and
mapping a template element of the second template to a virtual machine in a cloud computing environment as a function of a predicted resource requirement of the template element from the second template and the resource availability of the virtual machine in response to a predicted use of the second template.

16. The method of claim 1, wherein the template is reallocated to different cloud environments.

17. The method of claim 1, further comprising:
discarding the template by removing a template image from an image repository.

18. The method of claim 1, wherein mapping the template element is based on a proximity to other processing elements in the operator graph.

19. The method of claim 1, wherein the calculating the resource requirements includes predicting the resource requirement based off a history of the template.

20. The method of claim 1, wherein allocating the template occurs based on whether the template is on a virtual machine that supports adjacent processing elements in the operator graph.

* * * * *